LEFT HAND ROTATION: $0 < \theta < \frac{\pi}{2}$

RIGHT HAND ROTATION: $\frac{\pi}{2} < \theta < \pi$

United States Patent Office 3,523,294
Patented Aug. 4, 1970

3,523,294
POLARIZATION-PLANE TRACKING
RECEIVING SYSTEM
Soji Okamura, Yokohama-shi, Junzo Murakami, Kawasaki-shi, Joji Hamasaki, Tokyo, and Kazuaki Takao, Kyoto-fu, Japan, assignors to Tokyo Shibaura Electric Co., Ltd., Kawasaki-shi, Japan, a corporation of Japan; Joji Hamasaki, Tokyo, Japan; and Kazuaki Takao, Kyoto-fu, Japan
Filed Jan. 3, 1969, Ser. No. 788,728
Claims priority, application Japan, Jan. 24, 1968, 43/3,703
Int. Cl. H04b 7/10
U.S. Cl. 343—100                                    15 Claims

ABSTRACT OF THE DISCLOSURE

Incoming elliptically polarized electromagnetic waves are picked up by separating said waves into two right- and left-hand circularly polarized components. The two picked up signals are allowed to pass through an infinite variable phase shifter and electric power combining means in succession and supplied to a detector of amplitude ratios and phase differentials. The outputs from the detector which correspond to the amplitude ratios and phase differentials are fed back through a servo system to the variable drive means of the infinite variable phase shifter and electric power combining means. These output signals are supplied to one of the output sides, with their phases equalized by the infinite variable phase shifter and their amplitudes combined in the most suitable ratio for that output side by the electric power combining means. Thus there is arranged an indication apparatus in such a manner that incoming electromagnetic waves are picked up in accordance with variations in the polarization-plane, and that the degree of elliptical polarization, direction of the main axis of the ellipsis can be read from the amount of displacement exhibited by the variable drive means.

---

The present invention relates to a polarization-plane tracking receiving system and more particularly to one which tracks and picks up electromagnetic waves issued from a non-directive antenna set up in a space-flying vehicle by a tracking mechanism utilizing the polarization characteristics of such waves thereby to furnish information on the attitude of the flying vehicle from the amount of displacement exhibited by the tracking mechanism.

When there are received incoming weak electromagnetic waves emitted from a space-flying vehicle such as a rocket or space satellite, the signals sometimes become very weak when received depending on the relative positions of the antenna carried on the flying vehicle and that of the ground receiving antenna so that telecommunication between these two points is made impossible. If an electric field in the receiving point which is available for issuing signals is found to be absolutely weak as a result of a detecting attempt by varying the polarization-plane of the antenna of a ground receiving antenna in all possible ways, then telecommunication is naturally impossible. Generally, however, the antenna of a space-flying vehicle is designed as an approximately non-directive radiation type. Accordingly, it often happens that though the space electric field has in fact a sufficient intensity to allow signals therefrom to be received on the ground, telecommunication fails because the polarization characteristics of the ground receiving antenna are different from those of the antenna of a flying vehicle. To cope with such difficulties in receiving flying vehicle signals, the conventional practice has been to provide two or more ground receiving antennas having different polarization characteristics and carry out signal reception by selective use of these polarization characteristics as occasion demands. However, this process has the drawbacks that the mechanism and operation are complicated and the efficiency of receiving space signals was substantially low.

The main object of the present invention is to provide a polarization-plane tracking receiving system which carries out automatic matching between the polarization characteristics of the ground receiving antenna and those of incoming flying vehicle signals and enables said signals, however weak, to be picked up with a maximum efficiency, thereby correctly to detect the attitude of said flying vehicle.

The present invention can be more fully understood from the following detailed description when taken in connection with reference to the appended drawings, in which.

Figures 1, 2A:
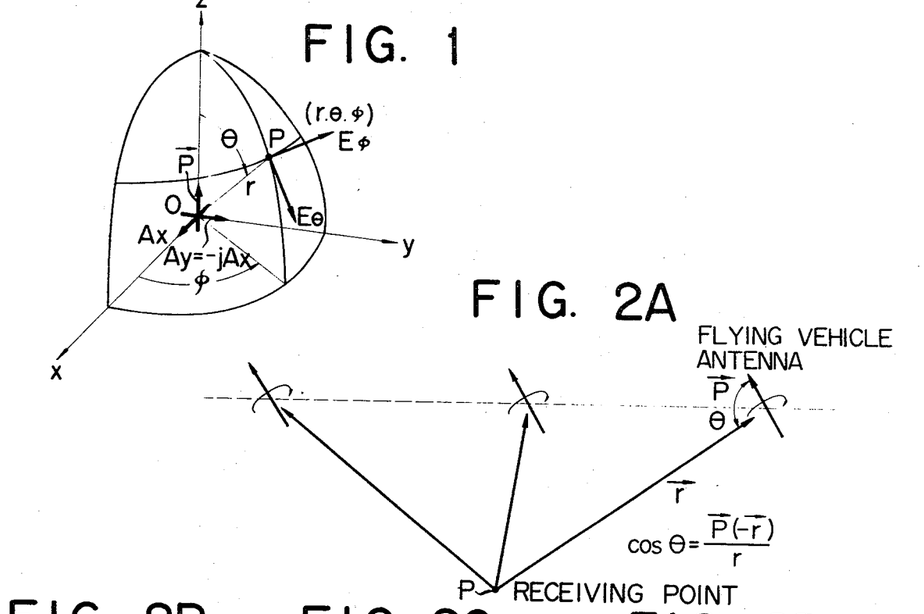
FIG. 1 is an illustration of the attitude vector $\vec{P}$ of a perpendicularly intersecting dipole antenna for transmission taken as a circularly polarized antenna.
FIG. 2A represents the relative position of a circular polarization antenna fitted to a space-flying vehicle and representing an attitude vector $\vec{P}$ with respect to a receiving point P.

Before describing the embodiment of the present invention, there will now be explained the principle thereof by reference to FIGS. 1 to 5. As illustrated in FIG. 1, let us take three systems $x$, $y$ and $z$ on the three dimensional rectangular coordinates, place the base point O thereof in the dipole antenna, select a remote point P ($r$, $\theta$, $\phi$, as indicated by the polar coordinates) spaced from the base point O by a distance $r$ fully larger than the wavelength $\lambda$, and designate a component in the direction of $\theta$ in a radiation field adjacent to said point P as $E_\theta$ and a component in the direction of $\phi$ as $E\phi$. Then there will be established the following equations:

When the dipole antenna is positioned in the direction of $x$ $$E_\theta = +Ax \cos \theta \cdot \cos \phi \qquad (1)$$
$$E\phi = -Ax \sin \phi$$

When the dipole antenna is positioned in the direction of $y$ $$E_\theta = Ay \cos \theta \cdot \sin \phi \qquad (2)$$
$$E\phi = +Ay \cos \phi$$

where $Ax$ and $Ay$ are constants associated with the distance $OP(=r)$

Assuming $Ay = -jAx$ and that $Ay$ is delayed 90° from $Ax$, then $$E_\theta = +Ax \cos \theta \cdot e^{-j\theta} \qquad (3)$$
$$E\phi = -jAx \cdot e^{-j\theta}$$

This in the case of $\theta=0$, the electromagnetic field of a perpendicularly intersecting dipole antenna for transmission will assume a left-hand circularly polarized wave (right-hand rotation with respect to the direction in which the electromagnetic wave proceeds), and in the case of $\theta=\pi$ a right-hand circularly polarized wave (left-hand rotation with respect to the direction in which the electromagnetic wave proceeds). In any of the left- and right-hand circularly polarized waves and intermediate elliptical polarization, the average intensity of the electromagnetic field per unit time will be $$|E| = |Ax|\sqrt{1+\cos^2 \theta} \qquad (4)$$

Thus the intensity of the electromagnetic field will vary only to an extent of $\sqrt{2}:1$ (3 db in the form of electric power received) at most according to changes in the direction in which the electromagnetic wave travels. Namely, if a flying vehicle is fitted with a transmission antenna consisting of a perpendicularly intersecting dipole, the respective poles of which differ 90° in phase but are excited with an equal amplitude, then variations in the intensity of the electromagnetic field of the received signal resulting from the changed attitude of a flying vehicle will not exceed 3 db.

Figure 2B:
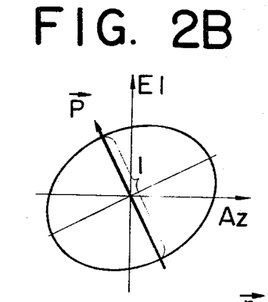
FIGS. 2B and 2D indicate the polarization characteristics exhibited by incoming electromagnetic waves at the receiving point P.
Figure 2C:
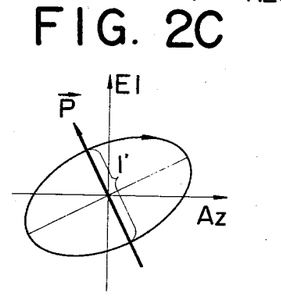
Figure 2D:
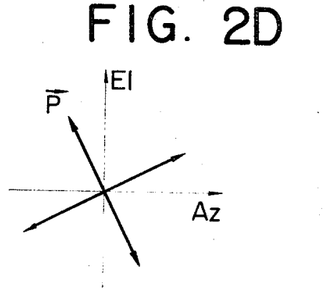

In the case of $Ay = -jAx$, the electromagnetic field on the ground of signals issued from a flying vehicle is hereinafter represented by the Equation 3 which is regarded as a radiation electromagnetic field of signals transmitted from the circular polarization antenna for transmission carried by a flying vehicle. A unit vector in the direction of the axis $z$ is denoted by $\vec{P}$ as shown in FIG. 1. The ground receiving antenna is supposed to consist of a perpendicularly intersecting dipole antenna comprising a group of dipoles, one of which is disposed in the direction of the elevation and the other of which is positioned in the direction of the azimuth, or a Yagi (trade name) antenna. When signals are issued from a circular polarization antenna fitted to a flying vehicle and displaying an attitude vector represented by $\vec{P}$ as shown in FIG. 2A, the polarization characteristics of the electromagnetic waves received at a point P on the ground are represented in FIGS. 2B, 2C and 2D. As seen from FIG. 1 and the Equation 3, the received electromagnetic wave will assume an elliptical polarization form which has a shorter axis in the direction in which the plane defined by the antenna at the receiving point disposed in the direction of elevation and the antenna at said point positioned in the direction of the attitude intersects the plane defined by the azimuth vector $\vec{P}$ displayed by the transmission antenna on a flying vehicle and the radial vector $\vec{r}$. The ratio of the lengths of the longer and shorter axes of said elliptical polarization (the ratio of elliptical polarization) is equal to $\cos \theta$. Accordingly, if measurement is made of the angle $\psi$ defined by the direction of the shorter axis of the elliptical polarization with the antenna positioned in the direction of azimuth, the ratio $\cos \theta$ of the elliptical polarization and the direction in which the elliptical polarization rotates, then it is possilbe to detect the relative attitude of the flying vehicle antenna with respect to the ground receiving antenna.

Figure 3A:
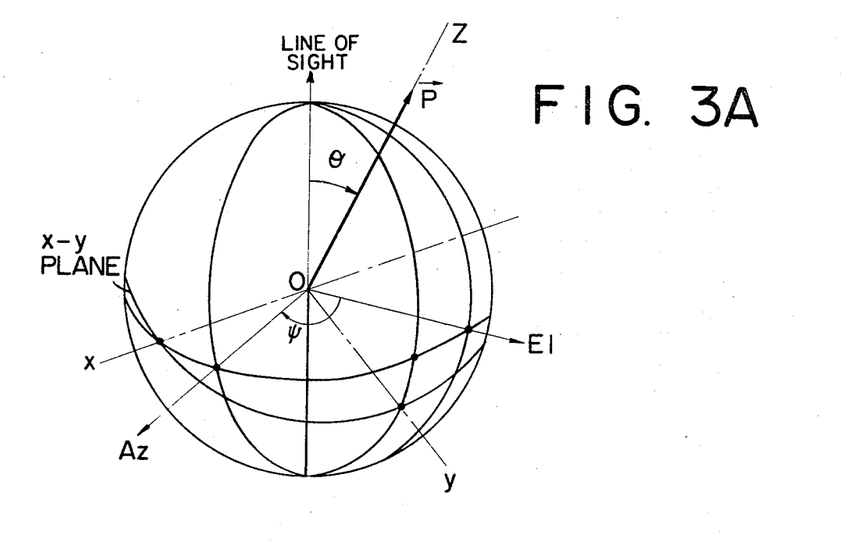
FIG. 3A illustrates the relationship of the attitude vector $\vec{P}$ and the ground antenna system.

The relationship of the ground receiving antenna and attitude vector $\vec{P}$ are indicated in FIG. 3A. As seen from the polarization characteristics of FIG. 3B, $\theta$ may be primarily determined from the ratio of elliptical polarization and the direction of rotation of the elliptical polarization, but the displacement of the angle $\psi$ can not be noticed even if it corresponds to an integral multiple of $\pi$. This results from the fact that as clearly seen from the Equation 3, variations in the angle $\phi$ shown in FIG. 1 only cause the phases of the received electromagnetic waves $E_\theta$ and $E\phi$ to be correspondingly displaced and are entirely unrelated to the polarization characteristics of the received electromagnetic waves.

If the voltages impressed by the received electromagnetic waves on the dipole antenna, the dipoles of which are disposed in the direction of the elevation and the direction of the azimuth respectively, are designated as $E_a$ and $E_e$ respectively, $$\begin{aligned}E_a &= A \cos u \cdot e^{-j\delta a}\\ E_e &= A \sin u \cdot e^{-j\delta e}\end{aligned} \qquad (5)$$

where $0 \leq u \leq \pi/2$ and $A$ is a positive real number.

With the instant output voltages of both antennas denoted by $V_a$ and $V_e$, $$\begin{aligned}V_a &= V \cos u \cdot \cos (\tau - \delta a)\\ V_e &= V \sin u \cdot \cos (\tau - \delta e)\end{aligned} \qquad (6)$$

where $V$ is a positive real number, $\tau = \omega t + \alpha$ ($\alpha$ denotes a fixed phase angle) and $\omega$ is the angular frequency of the received electromagnetic waves. Here, an equation associated with an ellipse denoting the polarization characteristics may be expressed as follows:

$$\left(\frac{V_a}{\cos u}\right)^2 + \left(\frac{V_e}{\sin u}\right)^2 - 2\frac{V_a \cdot V_e}{\sin u \cdot \cos u} \cos (\delta e - \delta a)$$
$$= V^2 \sin^2 (\delta e - \delta a) \qquad (7)$$

From the Equation 7 may be determined the angle $\psi$ defined by the axis of the ellipsis with the direction of azimuth as follows:

$$\tan 2\psi = (\tan 2u) \cos (\delta e - \delta a) \qquad (8)$$

With the ratio of elliptical polarization (ratio of the length of the longer axis of that of the shoter axis) denoted as $\tan x$ (where $x > 0$ in case fo left-hand rotation, and $x < 0$ in case of right-hand rotation), then $$\sin 2x = (\sin 2u) \sin (\delta e - \delta a) \qquad (9)$$

where $$-\frac{\pi}{4} \leq x \leq \frac{\pi}{4}$$

Figures 3B, 5:
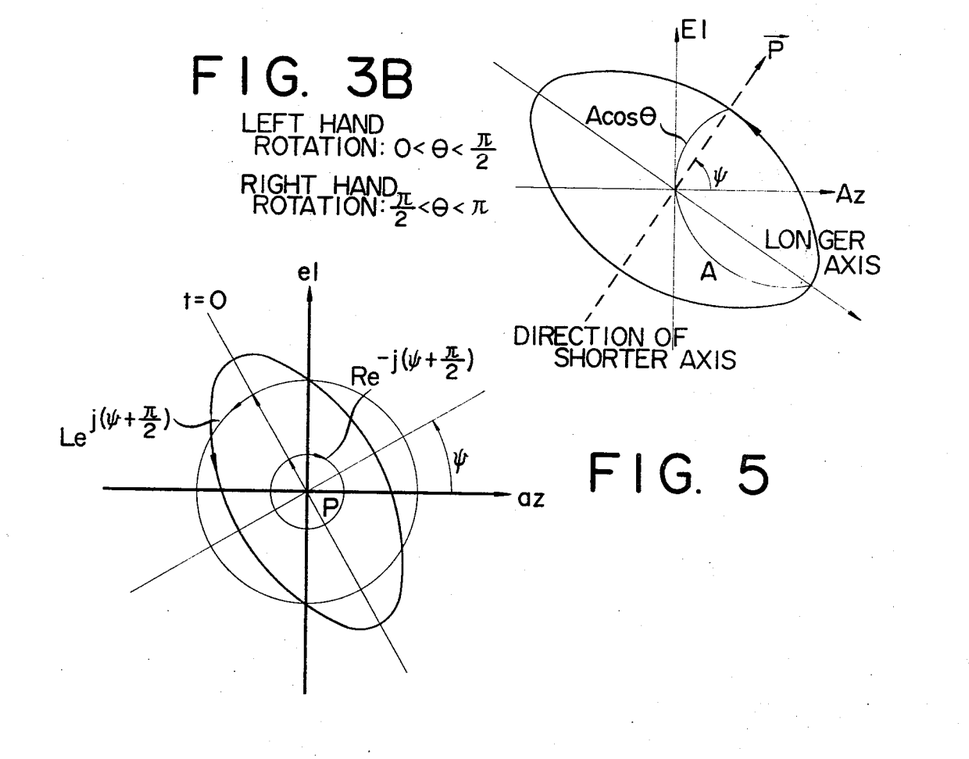
FIG. 3B shows the relationship of the attitude vector $\vec{P}$ and the polarization characteristics of the electromagnetic wave received.
FIG. 5 is an illustration of the elliptical polarization where it is separated into two circularly polarized components.

From FIG. 3B and the Equation 3

$$\cos \theta = \tan x \qquad (10)$$

Accordingly, if $u$ and $(\delta e - \delta a)$ are measured, it will be possible to determine $\psi$ and $\theta$ from the Equations 8, 9 and 10. From the results obtained can be determined the direction and orientation of the attitude vector P.

It is found from the Equations 8 and 9 that $\psi$ and $x$ satisfy the relationships:

$$\begin{aligned}S_0 &= A^2\\ S_1 &= A^2 \cos 2x \cdot \cos 2\psi = A^2 \cos 2u\\ S_2 &= A^2 \sin 2\psi \cdot \cos 2x = A^2 \sin 2u \cdot \cos (\delta e - \delta a)\\ S_3 &= A^2 \sin 2x = A^2 \sin 2u \cdot \sin (\delta e - \delta a)\end{aligned} \qquad (11)$$

using $S_0$, $S_1$, $S_2$ and $S_3$ known as the Strokes parameters.

Accordingly, $(u, \delta e - \delta a)$ may be converted to $(\psi, x)$ using a special analog computer.

The present invention relates to a new polarization-plane tracking receiving system, wherein an antenna for tracking a polarization-plane consists of one for receiving flying vehicle signals in the form separated into right- and left hand circularly polarized components, and when the receiving antenna is mounted on an antenna stand designed to be always electrically positioned in the direction in which a flying vehicle is travelling so as to track it, then the attitude of a flying vehicle, for example, a space satellite can be determined from outputs of a ground receiving antenna tracking the flying vehicle signals by analyzing the polarization characteristics thereof.

There will now be further detailed the principle of the present receiving system. As shown in FIG. 3B, the received electromagnetic wave is generally in the form of elliptical polarization, wherein the direction of the shorter axis accords with $\psi$.

Figure 4:
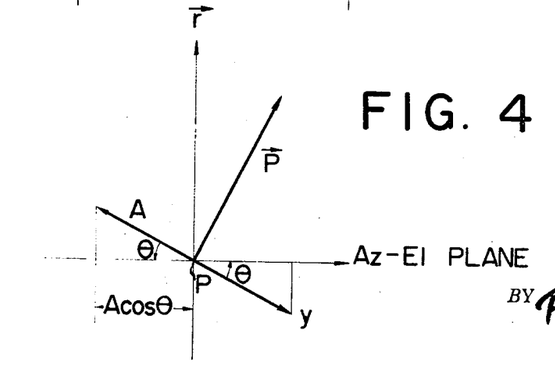
FIG. 4 is an illustration of the length of the shorter axis of the elliptical polarization.

Referring now to FIG. 4, with the length of the longer axis of an ellipsis taken as 2A, that of the shorter axis will be $2A \cos \theta$. The length of the longer axis has a value associated with the length of the radial vector $\vec{r}$ up to the flying vehicle. The distance being fixed, said value is a constant unrelated to $\theta$. The elliptical polarization of FIG. 3B can be divided into right- and left-hand circularly polarized components. The terms "right-hand rotation" and "left-hand rotation" are defined with respect to the negative direction of the radial vector $\vec{r}$.

If the time at which the direction of the electromagnetic field of the right-hand circular polarization agrees with that of the left-hand circular polarization is taken as the base time point, the right-hand circular polarization is delayed $$\psi + \frac{\pi}{2}$$

in phase, whereas the left-hand circular polarization advances $$\psi + \frac{\pi}{2}$$

in phase. This may be expressed as follows:

Left-hand circular polarization:

$$Le^{j\left(\psi+\frac{\pi}{2}\right)}$$

Right-hand circular polarization:

$$Re^{-j\left(\psi+\frac{\pi}{2}\right)} \quad (12)$$

where L and R denote the amplitudes of the respective rotations.

From FIG. 3B, there will result the following equations $$L+R=A \quad (13)$$
$$L-R=A \cos \theta$$

In case of $-\pi/2 < \theta < \pi/2$, then $L > R$, namely, left-hand elliptical polarization. Particularly in case of $\theta = 0$, signals of left-hand circular polarization are received.

Resolving the Equation 13, L and R may be determined as follows:

$$L=\frac{A}{2}(1+\cos \theta)$$
$$R=\frac{A}{2}(1-\cos \theta) \quad (14)$$

The ratio of the elliptical polarization, namely, the ratio of right- and left-hand circular polarizations may be determined from the Equations 12 and 13 as follows:

$$\tan x = \cos \theta = \frac{1-\frac{R}{L}}{1+\frac{R}{L}} \quad (15)$$

Namely, the aforementioned ratio is determined only by the ratio of amplitudes $R/L$, independently of the phases of the right- and left-hand circular polarization signals. In this fact lies the important advantage of the receiving system of the present invention.

Figures 6, 9:
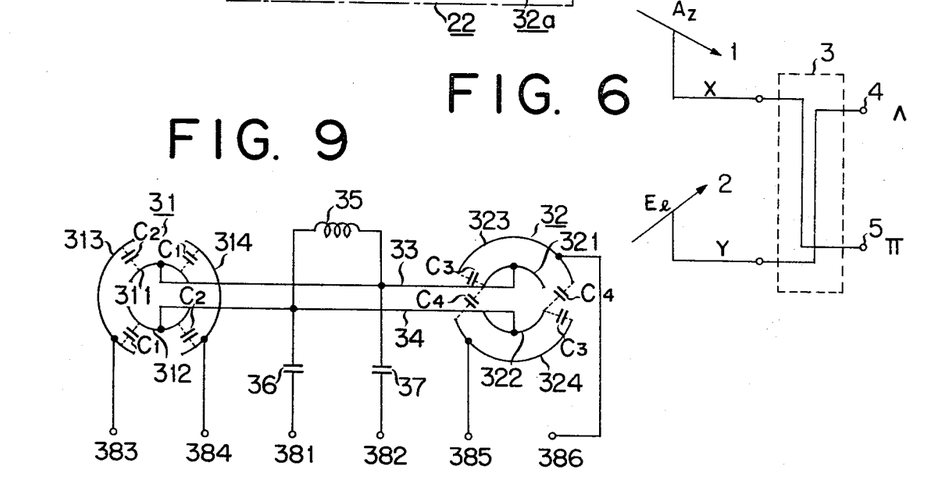
FIG. 6 schematically illustrates the arrangement of a circularly polarized antenna according to an embodiment of the present invention.
FIG. 9 represents an equivalent circuit illustrative of a condenser goniometer used in the directional variable coupler.

There will now be described the arrangement and function of the present invention. FIG. 6 illustrates an antenna for receiving flying vehicle signals in the form separated into right- and left-hand circularly polarized components.

When signals received by the poles 1 and 2 of a dipole antenna, which are positioned in the direction of elevation and that of the angle of azimuth respectively, are combined by a directional coupler 3 of ¼λ wavelength and 3 db, there is produced a right-hand circularly polarized component at the terminal 4 and a left-hand circularly polarized component at the terminal 5. Accordingly, if the outputs from the terminals 4 and 5 are denoted as $\Lambda$ and $\Pi$ respectively in terms of a vector. There will result from the Equations 12 and 14 the following equations:

$$\Lambda = Re^{-j\left(\psi+\frac{\pi}{2}\right)} = \frac{A}{2}(1-\cos \theta)e^{-j\left(\psi+\frac{\pi}{2}\right)}$$

$$\Pi = Le^{j\left(\psi+\frac{\pi}{2}\right)} = \frac{A}{2}(1+\cos \theta)e^{j\left(\psi+\frac{2}{\pi}\right)} \quad (16)$$

Then it will be seen that the inputs $\Lambda$ and $\Pi$ to the receiver exactly correspond to the parameters $\theta$ and $\psi$ representing the attitude of a space satellite. Thus, if $(R/L, \psi)$ or $(\theta, \psi)$ are measured, it will be possible immediately to find the attitude of a non-directive antenna carried on a flying vehicle. The receiving system of the present invention eliminates the necessity of converting parameters using an analog computer or the like in particular.

Figures 7, 13:
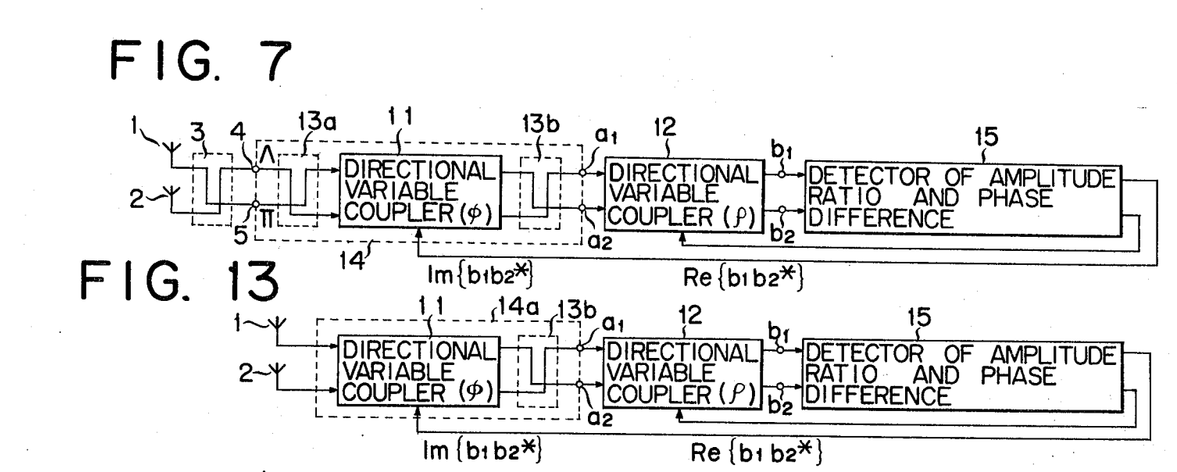
FIG. 7 schematically shows the arrangement of a receiving system embodying the present invention.
FIG. 13 schematically indicates a modification of the embodiment of FIG. 7.

$R/L$ and $\psi$ may be measured in the following manner. Namely, as shown in FIG. 7, an infinite variable phase shifter 14 formed by connecting a first directional variable coupling circuit 11 and two 3 db directional couplers 13a and 13b and a second directional variable coupling circuit 12 having the sine properties as the first directional variable coupling circuit 11 are used in the high frequency combination of both inputs $\Lambda$ and $\Pi$ to the receiver. Then a detector of amplitude ratios and phase differences 15 is combined with the later described servo system which drives the two directional variable coupling circuits by the output voltage of said detector to vary the degree of combining between these circuits. Thus is arranged the polarization-plane tracking receiving system of the present invention. The infinite variable phase shifter coordinates both received signals to the same phase. One directional variable coupling circuit 12 is so actuated as to combine the amplitudes of both signals in an optimum ratio for one output side designated as $b_1$ or $b_2$. In FIG. 7, the transfer matrix of the 3 db directional coupling circuit 13 may be denoted as follows:

$$H=\frac{1}{\sqrt{2}}\begin{bmatrix} 1 & -j \\ -j & 1 \end{bmatrix} \quad (17)$$

The transfer matrix of the directional variable coupling circuit may be expressed as follows:

$$G=\begin{bmatrix} \cos \phi & -\sin \phi \\ \sin \phi & \cos \phi \end{bmatrix} \quad (18)$$

The outputs $a_1$ and $a_2$ from the phase shifter 14 will be determined from the Equations 17 and 18 as follows:
Assuming $$\begin{bmatrix} a_1 \\ a_2 \end{bmatrix} = H \cdot G \cdot H \begin{bmatrix} \Lambda \\ \Pi \end{bmatrix} = -j \begin{bmatrix} 0 & e^{-j\phi} \\ e^{j\phi} & 0 \end{bmatrix} \begin{bmatrix} \Lambda \\ \Pi \end{bmatrix} \quad (19)$$

$$\psi + \frac{\pi}{2} - \phi \equiv \delta \quad (20)$$

$$j\frac{A}{2} \equiv K \quad (21)$$

Then, $$\begin{bmatrix} a_1 \\ a_2 \end{bmatrix} = K \begin{bmatrix} (1+\cos\theta)e^{j\delta} \\ (1-\cos\theta)e^{-j\delta} \end{bmatrix} \quad (22)$$

If the outputs obtained by passing the aforesaid outputs $a_1$ and $a_2$ through the second directional variable coupling circuit 12 are designated as $b_1$ and $b_2$ respectively and the parameter of said coupling circuit 12 as $\rho$, then $$\begin{bmatrix} b_1 \\ b_2 \end{bmatrix} = \begin{bmatrix} \cos\rho & -\sin\rho \\ \sin\rho & \cos\rho \end{bmatrix}$$

$$= K \begin{bmatrix} \cos\rho(1+\cos\theta)e^{j\delta} - \sin\rho(1-\cos\theta)e^{-j\delta} \\ \sin\rho(1+\cos\theta)e^{j\delta} + \cos\rho(1-\cos\theta)e^{-j\delta} \end{bmatrix} \quad (23)$$

Thus the outputs from the phase detector corresponding to a combination of $b_1$ and $b_2$ may be denoted as $Re\{b_1 b_2^*\}$ and the outputs from the phase detector corresponding to a combination of $b_1$ delayed by $\pi/2$ in phase and $b_2$ may be expressed as $Im\{b_1 b_2^*\}$. From the Equation 23, therefore, will result the following equations:

$$Re\{b_1 b_2^*\} = K^2(\sin^2\theta \cos 2\rho \cos 2\delta + 2\cos\theta \sin 2\rho) \quad (24)$$

$$Im\{b_1 b_2^*\} = K^2 \cdot \sin^2\theta \sin 2\delta \quad (25)$$

where $b_1$ and $b_2$ are complex values and the mark * is a conjugate value thereof.

If the later described infinite variable phase shifter servo is actuated by one of the outputs from the phase detector, namely, $Im\{b_1 b_2^*\}$, then the servo will be converged to $$\delta = n\pi \text{ or } (n+\tfrac{1}{2})\pi \quad (26)$$

If connection is so made as to the selection $(n+\tfrac{1}{2})\pi$ as a stable solution, then from the Equation 20 will result the following equation:

$$\psi = \phi + n\pi \quad (27)$$

Further, in case of $\delta = (n+\tfrac{1}{2})\pi$, $\cos 2\delta = -1$. Substituting this in the Equation 24, $$Re\{b_1 b_2^*\} = -K^2(\sin^2\theta \cos 2\rho - 2\cos\theta \sin 2\rho)$$
$$= -K^2(1+\cos^2\theta)\sin^2(\rho\theta - \rho) \quad (28)$$

where $$\rho\theta = \tan^{-1}\frac{\sin^2\theta}{2\cos\theta} \quad (29)$$

If, therefore, the later described servo system of the directional variable coupling circuit is actuated by the phase detector output $Re\{b_1 b_2^*\}$, then the servo system will be converged to $$\rho \doteq \rho\theta - n\pi \text{ or } \rho\theta - (n+\tfrac{1}{2})\pi \quad (30)$$

The selection of one of the above two values as a stable solution should be made on the basis of the polarity of the servo system when it is connected to the related apparatus.

Resolving the Equations 29 and 30, $\rho$ and $\theta$ will have the following relationship:

$$\cos\theta = -\tan\left(\rho \pm \frac{\pi}{4}\right) \quad (31)$$

If the servo system is so arranged as to allow $b_2$ to be converged to 0 as a differential signal, then the stable solution will correspond to one of the two solutions $$\cos\theta = -\tan\left(\rho - \frac{\pi}{4}\right) \quad (32)$$

as indicated by the double rotation $\pm$ of the Equation 31. In case of $b_2 = 0$, $$b_1 = \sqrt{2}|K|\sqrt{1+\cos^2\theta} \quad (33)$$

Since the electric power of the output signal concentrates on one of the terminals, it has been proved that it is possible to receive signals with a maximum efficiency, one of the prominent features of the tracking of the polarization plane involved in the receiving system of the present invention.

Figure 8:
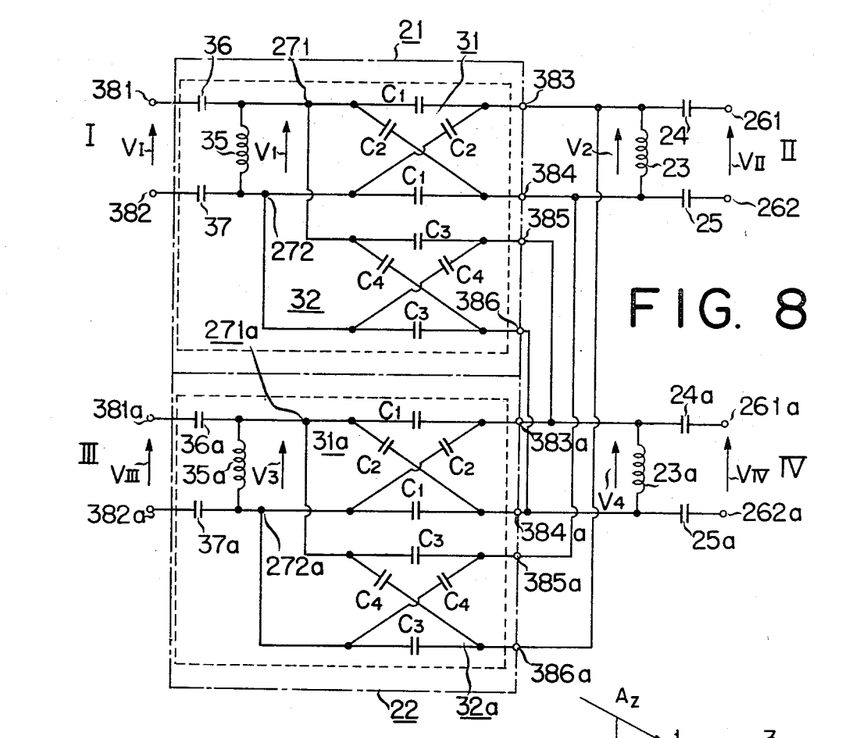
FIG. 8 is a circuit diagram of a directional variable coupler used in the above embodiment.

The directional variable coupler 12 is formed, for example, by combining two known condenser goniometers as shown in FIG. 8. The blocks 21 and 22 defined by the dotted lines of FIG. 8 denote first and second condenser goniometers. The goniometer (reference is only made to 21 for convenience) consists of two variable condensers connected by a rotary axle, each of which comprises a pair of fixed plates and a pair of rotary plates. The electric equivalent circuit of the goniometer is represented in FIG. 9. The first variable condenser 31 has a pair of rotary plates 311 and 312 and a pair of fixed plates 313 and 314. Similarly, the second variable condenser 32 has a pair of rotary plates 321 and 322 and a pair of fixed plates 323 and 324. The rotary and fixed plates of the condenser 32 are positioned at a point rotated 90° from those of the condenser 31. The rotary plates of the first and second variable condensers 31 and 32 are connected by a rotary axle (not shown) and made to rotate synchronously with each other. The rotary plates 311 and 321 are connected by a conductor 33 disposed on the rotary axle and the rotary plates 312 and 322 by another conductor 34 mounted on said rotary axle. Connected across both conductors 33 and 34 is an inductance element 35, both ends of which are connected through condensers 36 and 37 to input terminals 381 and 382 respectively. Each of the condensers 36 and 37 has that combined component involved in the capacities across the rotary and fixed plates which always retains a constant value regardless of the rotating angle of the rotary plates. The output of the goniometer is conductor out of the paired fixed plates of the first and second variable condensers 31 and 32. Namely, the first output terminals 383 and 384 are conducted from the fixed plates 313 and 314 respectively. The second output terminals 385 and 386 are led out of the fixed plates 323 and 324. The capacities across the rotary and fixed plates of the variable condensers 31 and 32 are $C_1$, $C_2$, $C_3$ and $C_4$ as indicated by the dotted lines of FIG. 9. These capacities may be expressed as follows depending on the rotating angle $\beta$ of the rotary plate.

$$\begin{aligned} C_1 &= C_0(1-\sin\beta) \\ C_2 &= C_0(1+\sin\beta) \\ C_3 &= C_0(1-\cos\beta) \\ C_4 &= C_0(1+\cos\beta) \end{aligned} \quad (34)$$

Figure 10A:
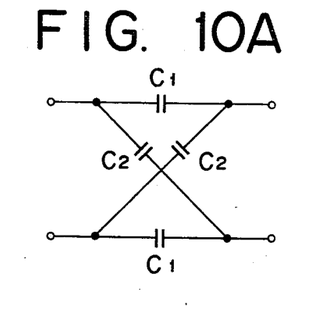
FIGS. 10A and 10B are equivalent circuits illustrating a part of the goniometer of FIG. 9.
Figure 10B:
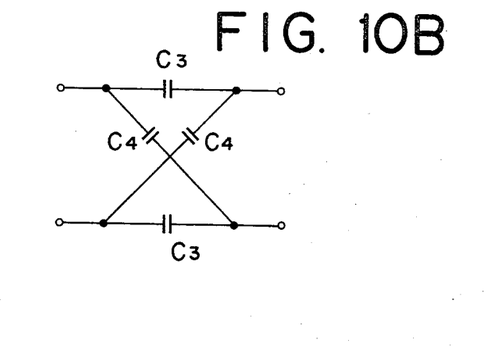

The variable condensers 31 and 32 may be indicated by the equivalent circuits of FIGS. 10A and 10B respectively on the basis of said capacities $C_1$ to $C_4$.

With the condenser goniometer of the aforesaid arrangement, where the output terminals 383–384 and 385–386 are supplied with a matching load, the input impedance as viewed from the input terminals 381 and 382 remains constant regardless of the rotating angle of the rotary plate and well matches the source impedance. The output voltage appearing at the first and second output terminals 383–384 and 385–386 is proportionate to the sine and cosine functions. Since the aforementioned condenser consists of an air gap type, it only suffers as extremely small insertion loss as less than 1 db, and is applicable in a variable power distributing circuit which is employed in a transmission apparatus. The other condenser goniometer 22 has the same arrangement as the aforementioned unit 21, so that the parts of the former are denoted by the same numerals as those of the latter, to which is added a suffix "a" and description thereof is omitted.

The first and second goniometers 21 and 22 are connected to each other on the output side in the following manner. Namely, the output terminals 383 and 384 of the first variable condenser 31 of the first goniometer 21 are connected in reversed phase relationship with the output terminals 385a and 386a of the second variable condenser 32a of the second goniometer. The output terminals 385 and 386 of the second variable condenser 32 of the first goniometer are connected parallel to the output terminals 383a and 384a of the first variable condenser 31a of the second goniometer 22 without reversing their phases. This means that the output terminals of the variable condenser issuing sine outputs at the rotating angle $\beta$ of one goniometer are connected to the output terminals of the variable condenser producing cosine outputs at the rotating angle $\beta$ of the other goniometer. The parallel connected output terminals of the variable condensers 31 and 32a are further connected to the terminals 261 and 262 through a parallel disposed inductance element 23 for matching and serially positioned condensers 24 and 25. The parallel connected output terminals of the variable condensers 32 and 31a are of exactly the same arrangement and connected to the terminals 261a and 262a through a parallel disposed inductance element 23a and serially arranged 24a and 25a. Thus the circuit of FIG. 8 forms an 8-terminal circuit having four pairs of terminals: 381–382, 261–262, 381a–382a and 261a–262a. For convenience of description, these pairs of terminals are hereinafter represented by the numerals I, II, III and IV.

There will now be described the properties of the above mentioned circuit, namely, the input impedance of the terminals and the directional feature of the respective terminals.

Figure 11:
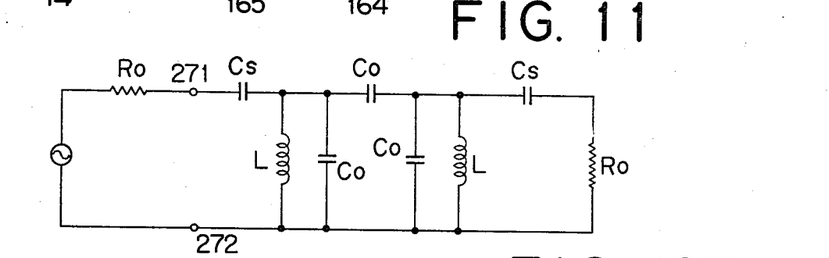
FIG. 11 is an equivalent circuit illustrating the circuit of FIG. 8.

Generally, when placed in a transmission line, a directional coupler displays a property of taking out the incoming wave and reflected wave on said line separately from each other and forms an 8-terminal circuit comprising four pairs of terminals which consists of a main transmission line and a supplementary transmission line having a coupling section in common. According to the theory of a circuit using an S matrix, where the terminals are fully matched with each other, the circuit is known to form a directional coupler. (Refer to, for example, "Microwave Engineering" edited by the Institute of Electrical Communication Engineerings of Japan and published by Corona in 1958, page 232.) Let us determine the input impedance of the input terminals I, II, III and IV of the circuit shown in FIG. 8. Referring first to the input terminals I, if the impedance as viewed from the right side of the paired terminals 383–384 is designated as 2, the admittance $yi$ estimated by viewing the load side from the pair terminals 271–272, may be expressed as follows:

$$yi = j\omega C_0 \frac{2+j3\omega C_0 Z}{1+j2\omega C_0 Z} \quad (35)$$

$$Z = \frac{j\omega L(1+j\omega C_S R_0)}{(1-\omega^2 L C_S)+j\omega C_S R_0} \quad (36)$$

where $C_0$ is the capacity of the variable condenser derived from the Equation 34 and $C_S$ is half the capacity of the condensers 24, 25, 24a and 25a of FIG. 8. Namely, let it be assumed that the respective condensers have a capacity of $2C_S$, which is equal to that of the condensers 36, 37, 36a and 37a on the input side. L is the value of the inductance elements 23 and 23a and also made equal to that of the inductance elements 35 and 35a on the input side. $R_0$ is a load resistance and $\omega$ is the angular frequency of the input A.C. signal. As seen from the Equation 35, the admittance $yi$ is unrelated to the rotating angle $\beta$ of the variable condenser. For the matching of the input terminals I, therefore, it will be sufficient to examine the special values of the rotating angle $\beta$. Assuming $\beta = \pi/2$, the entire equivalent circuit as viewed from the terminals I of FIG. 8 will be as illustrated in FIG. 11. Substituting the parallel circuits of L and $C_0$ of said figure with an equivalent inductance element having a value $L'$ there will result the following equation:

$$L' = \frac{L}{1-\omega^2 L C_0} \quad (37)$$

The impedance $Zin$ on the right side of the terminals 271 and 272 will be $$Zin = \frac{1}{j\omega C_S} + \cfrac{1}{\cfrac{1}{j\omega L'} + \cfrac{1}{\cfrac{1}{j\omega C_0} + \cfrac{1}{\cfrac{1}{j\omega L'} + \cfrac{1}{\cfrac{1}{j\omega C_S} + R_0}}}} \quad (38)$$

Assuming $Zin = R_0$ to determine the matching conditions, there will result the following equation:

$$2\omega^2 L' C_0 = \frac{(1-\omega^2 L' C_S)^2 + (\omega C_S R_0)^2}{(1-\omega^2 L' C_S) + (\omega C_S R_0)^2} \quad (39)$$

In the circuit of FIG. 8 all the terminals I, II, III and IV are disposed symmetrical, so that the aforesaid matching conditions are the same with respect to these terminals.

Accordingly, if all the terminals I, II, III and IV are terminated with a matching load $R_0$ where the Equation 39 is established, the input impedance as viewed from any of these terminals will be $R_0$, regardless of the rotating angle $\beta$. Thus the terminals will act as a directional coupler. Namely, the incoming electromagnetic waves from the terminals I, for example, are transferred to the terminals II and IV, but not to the terminals III. The incoming electromagnetic waves from the terminals III are also transferred to the terminals II and IV, but not to the terminals I. Since the circuit of FIG. 8 has a symmetrical arrangement, substitution of inputs with outputs or vice versa will, of course, result in the same effect.

There will now be described the degree of coupling among the terminals I, II, III and IV. With the voltage of the terminals 271–272 and 383–384 denoted as $V_1$ and $V_2$ respectively and the voltages of the terminals I and II as $V_I$ and $V_{II}$ respectively, then there will result the following equation:

$$\frac{V_2}{V_1} = \frac{j\omega C_0 Z}{1+j2\omega C_0 Z} \sin \beta \quad (40)$$

Therefore, $$\frac{V_{II}}{V_I} = \frac{V_1}{V_I} \cdot \frac{V_2}{V_1} \cdot \frac{V_{II}}{V_2}$$

$$= \frac{1}{\left(1-\dfrac{1}{\omega^2 L C_S}\right) + \dfrac{yi}{j\omega C_S}} \cdot \frac{j\omega C_0 Z}{1+j2\omega C_0 Z} \cdot \frac{j\omega C_S R_0}{1+j\omega C_S R_0} \sin \beta \quad (41)$$

Converting the Equation 41 by substituting the Equations 35 and 36 therein and further using the Equations 39, then $$\left|\frac{V_{II}}{V_I}\right| = |\sin \beta| \quad (42)$$

Similarly the relationship between $V_1$ and the voltage $V_4$ across the terminals 383a and 384a will be $$\frac{V_4}{V_1} = \frac{j\omega C_0 Z}{1+j2\omega C_0 Z} \cos \beta \quad (43)$$

Thus, $$\left|\frac{V_{IV}}{V_I}\right| = |\cos \beta| \quad (44)$$

Namely, the output voltages of the terminals II and IV remain constant in phase regardless of the rotating angle $\beta$ and are proportionate in amplitude to $\sin \beta$ and $\cos \beta$.

There has been proved the directional coupling property of the variable directional coupling circuit used in the present invention. Expressed by an S matrix, the property will be $$S = \begin{pmatrix} 0 & \sin \beta & 0 & \cos \beta \\ \sin \beta & 0 & -\cos \beta & 0 \\ 0 & -\cos \beta & 0 & \sin \beta \\ \cos \beta & 0 & \sin \beta & 0 \end{pmatrix} \cdot e^{-j\beta_0} \quad (45)$$

where $\beta_0$ is a constant

The degree C of coupling displayed by this directional coupler will be $$C = \cos \beta \quad (46)$$

Thus the coupling of 0 db will be possible in case of $\beta = n\pi (n=0, 1, 2, \ldots)$.

The aforementioned variable coupler is formed of a variable condenser provided with an electrode plate of special shape and, combined concentrated constant circuits such as a coupling condenser and inductance element, so that the coupler can be used in an extremely compact and light form even with signals having a long wave and a frequency of below the VHF band. Moreover, the degree of coupling exhibited by the directional coupler can be continuously varied from 0 to 1 by changing the rotating angle $\beta$ of the rotating plate of the variable condenser, and the input and output impedances can always be kept constant regardless of changes in the rotating angle $\beta$, with extremely small insertion loss. Consequently, the coupler can be used not only as an electric power distribution, but also as a variable attenuator, loss-free variable phase shifter and a means for combining two input waves.

There will now be described the function of the coupler as a combining means. The voltages $V_I$, $V_{II}$, $V_{III}$ and $V_{IV}$ of the terminals have the following relationship as the input and output voltages:

$$\begin{pmatrix} V_{II} \\ V_{IV} \end{pmatrix} = e^{-j\beta_0} \begin{pmatrix} \sin \beta & -\cos \beta \\ \cos \beta & \sin \beta \end{pmatrix} \begin{pmatrix} V_I \\ V_{III} \end{pmatrix} \quad (47)$$

Assuming the input voltages to be $$V_I = V_I e^{j\omega t}, \quad V_{III} = V_{III} e^{j\omega t} \quad (48)$$

Then, $$V_{II} = (V_I \sin \beta - V_{III} \cos \beta) e^{j\omega t} \quad (49)$$
$$V_{IV} = (V_I \cos \beta + V_{III} \sin \beta) e^{j\omega t}$$

With $$\beta = \tan^{-1} \frac{V_{III}}{V_I} \quad (50)$$

Then, $$V_{II} = 0, \quad V_{IV} = \sqrt{V_I^2 + V_{III}^2} \, e^{j\omega t} \quad (51)$$

Namely, the aforementioned circuit enables two high frequency electric power components to be combined with an equal phase and in any desired amplitude ratio.

The foregoing description only referred to a condenser goniometer. But the goniometer is not restricted to this type. As is well known, the goniometer includes a variety of types involving mutual inductance, which are capable, like the condenser goniometer, of producing an output voltage having amplitudes which vary in the sine and cosine functional relationship with respect to the rotating angle $\beta$ of a rotating element disposed adjacent to a stationary element. Accordingly, substitution of the condenser goniometer of the aforesaid arrangement with any of said types will bring about exactly the same effect.

If, as shown in FIG. 7, there are connected 3 db directional couplers 13a and 13b of the known type as supplement units before and after the aforesaid directional variable coupling circuit, there can be obtained a variable phase shifter 14 which can continuously shift the phase to an infinite extent without being accompanied with the instantaneous attenuation of amplitude. The infinite variable phase shifter 14 of FIG. 7 is formed by attaching supplementary 3 db directional variable couplers 13a and 13b before and after the aforementioned directional variable coupling circuit 11. The S matrix of the 3 db directional couplers 13a and 13b may be indicated as follows:

$$S = \frac{1}{\sqrt{2}} \begin{pmatrix} 0 & 1 & 0 & j \\ 1 & 0 & j & 0 \\ 0 & j & 0 & 1 \\ j & 0 & 1 & 0 \end{pmatrix} \quad (52)$$

If the voltages at the four terminals of the 3 db directional coupler 13a or 13b of FIG. 7 are denoted as $v_1$, $v_2$, $v_3$ and $v_4$ respectively, the relationship of the input voltages $v_1$ and $v_3$ and the output voltages $v_2$ and $v_4$ may be indicated as follows:

$$\begin{pmatrix} v_1 \\ v_2 \end{pmatrix} = \frac{1}{\sqrt{2}} \begin{pmatrix} 1 & -j \\ -j & 1 \end{pmatrix} \begin{pmatrix} v_2 \\ v_4 \end{pmatrix} \quad (53)$$

The input and output voltages of the directional variable coupling circuit 11 will have the following relationship:

$$\begin{pmatrix} v_1 \\ v_3 \end{pmatrix} = e^{-j\beta_0} \begin{pmatrix} \sin \beta & -\cos \beta \\ \cos \beta & \sin \beta \end{pmatrix} \begin{pmatrix} v_2 \\ v_4 \end{pmatrix} \quad (54)$$

Accordingly, the input voltages $v_I$ and $v_{III}$ and output voltages $v_{II}$ and $v_{IV}$ of a circuit formed by fitting the above mentioned supplementary circuits will have the following relationship:

$$\begin{pmatrix} v_{II} \\ v_{IV} \end{pmatrix} = \frac{1}{2} e^{-j\beta_0} \begin{pmatrix} 1 & -j \\ -j & 1 \end{pmatrix} \begin{pmatrix} \sin \beta & -\cos \beta \\ \cos \beta & \sin \beta \end{pmatrix}$$
$$\begin{pmatrix} 1 & -j \\ -j & 1 \end{pmatrix} \begin{pmatrix} v_I \\ v_{III} \end{pmatrix} \begin{pmatrix} v_{II} \\ v_{IV} \end{pmatrix} = e^{-j\beta_0} \begin{pmatrix} 0 & -e^{j\beta} \\ e^{-j\beta} & 0 \end{pmatrix} \begin{pmatrix} v_I \\ v_{III} \end{pmatrix} \quad (55)$$

With $v_I = v_0$ and $v_{III} = 0$, then there will result the following from the Equation 55:

$$v_{II} = 0, \quad v_{IV} = e^{-j(\beta + \beta_0)} \cdot v_0 \quad (56)$$

Thus the voltage impressed on the terminals I will appear at the terminals IV with its phase delayed by $\beta + \beta_0$. The Equation 56 shows that at this time the amplitude of the output voltage is exactly the same as that of the input voltage, causing no insertion loss. In the directional variable coupling circuit 31, the rotating angle $\beta$ can be varied freely by the variable condenser, so that the aforesaid delayed phase can be changed to any desired extent. Since the rotating angle $\beta$ can be broadened to an extent of over 360°, the phase can be shifted to an infinite extent. Hence there is obtained an infinite variable phase shifter.

There will now be described the effect of such infinite variable phase shifter. First, the phase shifter comprises a directional variable coupling circuit consisting of concentrated constant circuit elements such as a condenser provided with an electrode plate of special shape and inductance element, so that it is possible to use an extremely compact and light phase shifter even with signals having a long wave and a frequency of below the VHF band. Secondly, the rotation of the rotary element of the directional variable coupling circuit permits the phase angle to be freely shifted. Moreover, since the input and output impedance of the directional variable coupling circuit always remains constant as against changes in the angle of shifted phases. The connection of the variable phase shifter with the 3 db directional coupling circuit requires no matching circuit, thus simplifying the circuit arrangement. Thirdly, the variable phase shifter theoretically suffers no insertion loss. It may be said in this connection that the combination of a 3 db directional coupling circuit and an ordinary phase shifting circuit exhibits an insertion loss of 3 db.

Figure 12:
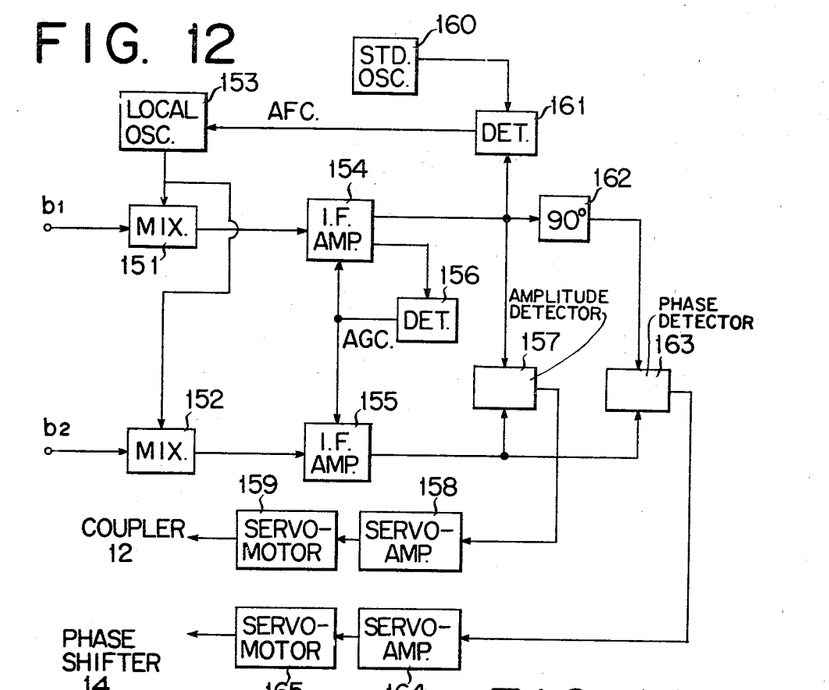
FIG. 12 shows the circuit arrangement in block diagram form of the detector of amplitude ratios and phase differentials used in the aforementioned embodiment.

There will now be concretely described the detector of amplitude ratios and phase differentials shown in FIG. 7 by reference to FIG. 12. Output signals from a directional variable coupler 12 constituting an electric power combining means are supplied through the terminals $b_1$ and $b_2$ to the mixers 151 and 152 of a detector 15. These mixers 151 and 152 are already supplied with outputs from a local oscillator 153. In the mixer, signals from the directional variable coupler 12 which correspond to the right- and left-hand circularly polarized components are subjected to frequency conversion and transferred to intermediate frequency amplifiers 154 and 155. Part of the output from one amplifier 154 is supplied to an amplitude detector 156. The output from the detector 156 is fed back to the amplifiers 154 and 155 to provide automatic gain control. Since the amplitudes of outputs therefrom become constant, with the degree of amplification by the respective amplifiers 154 and 155 denoted as G and the amplitudes of input signals thereto as A and B, then $$AG=K$$

Therefore, $$BG=\frac{B}{A}K$$

If, in this case, input signals to the amplifier 155 have an amplitude of zero, then the amplitude ratio $B/A$ will also be zero, causing no outputs to be issued from a detector of amplitude ratios. Accordingly, a servo-amplifier 158 and servo-motor 159 do not receive any input, so that the goniometer axle of the directional variable coupler 12 is not actuated. Under such condition, the directional variable coupler 12 issues outputs, in the form combined in a ratio most adapted only for the output terminal $b_1$. In contrast, where both terminals $b_1$ and $b_2$ of the directional coupler 12 give forth outputs, then there will appear outputs in the detector 157 in accordance with the ratio of their amplitudes. These outputs drive the servo-motor 159 after being amplified by the servo-amplifier 158, thus causing the goniometer axle of the coupler to be driven in such a manner that there will not be produced any output to the terminal $b_2$.

Outputs from the intermediate frequency amplifier 154, together with those from a standard frequency oscillator 160, are supplied to a phase detector 161 to be used as a signal for automatically controlling the frequency of the local oscillator 153. The output from amplifier 154 is then fed to a 90° phase shifter 162 to be shifted 90° in phase. Thus a phase detector 163 detects phase differentials between the 90° phase-shifted output from the amplifier 154 and the output from the amplifier 155. The phase detector 163 does not give forth any output when both output signals have a phase differential of 90° only caused by the phase shifter 162. In other cases, however, the phase detector 163 issues outputs, which in turn drive a servo-motor 165 after being amplified by a servo-amplifier 164 to cause the goniometer axle of the directional variable coupler 11 of the infinite variable phase shifter 14 to be rotated in such a manner that the phases of two outputs from the terminals $a_1$ and $a_2$ are automatically controlled so as to be equal.

To summarize, the converged fixed state of the servo system permits the parameters $\psi$ and $\theta$ of the attitude of the antenna carried by a flying vehicle to be easily determined from the rotating angles $\phi$ and $\rho$ of the directional variable coupling circuit involved in the phase co-ordinating servo and the amplitude combining servo, using the relationship expressed by the following equations:

$$\psi=\phi+n\pi \quad (57)$$

Degree of elliptical polarization:

$$\cos\theta=-\tan(\pi/4-\rho) \quad (58)$$

Now the most prominent effect of the present invention has been distinctly proved that the determination from the above two equations of the indicated degrees of the rotating angles $\phi$ and $\rho$ of the goniometer axle enables the two attitude parameters $\phi$ and $\theta$ to be directly read without using any analog computing means.

FIG. 7 shows two linearly connected 3 db directional couplers. Since this simply means in effect that one of the signal paths is arranged in a reversed relationship to the other, there will be obtained the same effect, even if the coupler is simplified as illustrated in FIG. 13. In the two linearly connected 3 db directional couplers 3 and 13a of FIG. 7, with the amplitudes of signals from the antennas 1 and 2 designated as E and F respectively, then the output signal from the terminal 4 will be $$E/\sqrt{2}-jF/\sqrt{2}$$

and that from the terminal 5 will be $-jE/\sqrt{2}+F/2\sqrt{}$. With respect to the output terminals of the 3 db directional coupler 13a, there will appear at one output terminal on the side directly connected to the antenna 2 a signal expressed as follows:

$$-j\tfrac{1}{2}(E-jF)+\tfrac{1}{2}(-jE+F)$$
$$=-jE/2-jE/2-F/2+F/2$$
$$=-jE \quad (58)$$

At the other output terminal will be obtained a signal of $-jF$. Namely, it will be seen that with the phase remaining unchanged, the signal paths are only reversed in effect. Accordingly, the infinite variable phase shifter 14a used in the foregoing embodiment appears to be formed of two circuits involved in the directional variable coupler 11 and the 3 db directional coupler 13b.

Figure 14:
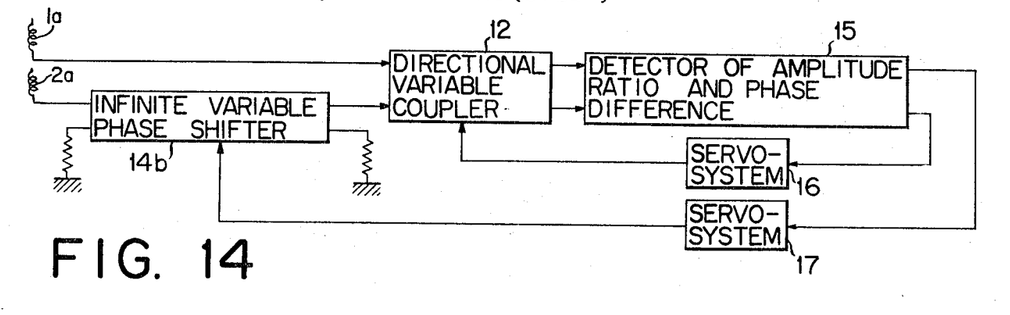
FIG. 14 is another modification of the same.

In the aforementioned embodiment, the infinite variable phase shifter 14 or 14a is made to shift the phases of inputs to both antennas 1 and 2. As shown in FIG. 14, however, it is possible to arrange an infinite variable phase shifter 14b in a manner to shift the phase of inputs only to one helical antenna 2a of the two helical antennas 1a and 2a, and ground the remaining pair of terminals through resistors. Also in this case, outputs from a circuit 15 for detecting amplitude ratios and phase differentials are fed back as in the aforesaid embodiment through servo systems 16 and 17 each formed of a servo-amplifier and servo-motor to the phase shifter 14b and coupler 12. All the foregoing description related to a dipole type receiving antenna. However, it will be apparent that a helical antenna in common use (not shown) may be employed in receiving circularly polarized signals.

What is claimed is:

1. In a polarization-plane tracking receiving system for tracking and receiving electromagnetic waves from a non-directive antenna disposed in a space-flying vehicle,
    a first means for receiving elliptically polarized electromagnetic waves having given polarization characteristics and separating same into right and left-hand circularly polarized components; and
    second means coupled to said first means and including:
        a variable phase shifter coupled to said first receiving means for shifting the phases of the received signal components;
        a combiner coupled to said phase shifter for combining the amplitudes of said received signal components;
        an amplitude detector coupled to said combiner for detecting the ratio of the amplitudes of said signal components;
        a phase detector responsive to said signal components for detecting the phase difference between said signal components; and
        feed back means for feeding back the output signals from said amplitude detector and from said phase detector to said combiner and to said phase shifter, respectively, said phase shifter being responsive to said signal fed-back from said phase detector to adjust the relative phases of said received signal components to be equal, and said combiner being responsive to said fed-back from said amplitude detector to combine the amplitudes of said received signal components according to a ratio which is a function of said signal fed-back thereto.

2. The system according to claim 1, wherein said phase shifter is an infinitely variable phase shifter.

3. The system according to claim 1, wherein said first means includes a pair of dipole antennas and a first 3 db directional coupler connected to each of said dipole antennas.

4. The system according to claim 3, wherein said phase shifter is an infinitely variable phase shifter.

5. The system according to claim 3, wherein said phase shifter comprises a second 3 db directional coupler; a directional variable coupler, the input thereof being connected to said second 3 db directional coupler; and a third 3 db directional coupler connected to the output of said first directional variable coupler.

6. The system according to claim 5, wherein said directional variable coupler comprises:
   a pair of input terminals;
   a first goniometer having a means including a variable condenser comprising a rotating element for supplying a first pair of output terminals with output signals of an amplitude proportionate to a product of the sine function of the rotating angle of said rotating element and to the amplitude of signals from said pair of input terminals;
   a second goniometer having a means including a variable condenser comprising a second rotating element for supplying a second pair of output terminals with outputs of an amplitude proportionate to a product of the cosine function of the rotating angle of said second rotating element and to the amplitude of signals from said pair of input terminals; and
   means connecting said pair of input terminals to an input of the first goniometer and to an input of the second goniometer.

7. The system according to claim 1, wherein said first means includes a pair of helical antennas positioned to receive the right- and left-hand circularly polarized signal components, respectively.

8. The polarization-plane tracking receiving system according to claim 7, wherein said phase shifter is an infinitely variable phase shifter.

9. The polarization-plane tracking receiving system according to claim 7, wherein said phase shifter comprises a first 3 db directional coupler; a directional variable coupler, the input thereof being connected to said first 3 db directional coupler; and a second 3 db directional coupler connected to the output of said directional variable coupler.

10. The system according to claim 9, wherein said directional variable coupler comprises:
    a pair of input terminals;
    a first goniometer having a means including a variable condenser comprising a rotating element for supplying a first pair of output terminals with output signals of an amplitude proportionate to a product of the sine function of the rotating angle of said rotating element and to the amplitude of signals from said pair of input terminals;
    a second goniometer having a means including a variable condenser comprising a second rotating element for supplying a second pair of output terminals with outputs of an amplitude proportionate to a product of the cosine function of the rotating angle of said second rotating element and to the amplitude of signals from said pair of input terminals; and
    means connecting said pair of input terminals to an input of the first goniometer and to an input of the second goniometer.

11. The system according to claim 1, wherein said first means and said variable phase shifter comprise: a pair of dipole antennas; a directional variable coupler connected to said pair of dipole antennas; and a 3 db directional coupler connected to said directional variable coupler.

12. The system according to claim 11, wherein said directional variable coupler comprises:
    a pair of input terminals;
    a first goniometer having a means including a variable condenser comprising a rotating element for supplying a first pair of output terminals with output signals of an amplitude proportionate to a product of the sine function of the rotating angle of said rotating element and to the amplitude of signals from said pair of input terminals;
    a second goniometer having a means including a variable condenser comprising a second rotating element for supplying a second pair of output terminals with outputs of an amplitude proportionate to a product of the cosine function of the rotating angle of said second rotating element and to the amplitude of signals from said pair of input terminals; and
    means connecting said pair of input terminals to an input of the first goniometer and to an input of the second goniometer.

13. The system according to claim 1, wherein said combiner includes a directional variable coupler.

14. The polarization-plane tracking receiving system according to claim 13, wherein said directional variable coupler comprises:
    a pair of input terminals;
    a first goniometer having a means including a variable condenser comprising a rotating element for supplying a first pair of output terminals with output signals of an amplitude proportionate to a product of the sine function of the rotating angle of said rotating element and to the amplitude of signals from said pair of input terminals;
    a second goniometer having a means including a variable condenser comprising a second rotating element for supplying a second pair of output terminals with outputs of an amplitude proportionate to a product of the cosine function of the rotating angle of said second rotating element and to the amplitude of signals from said pair of input terminals; and
    means connecting said pair of input terminals to an input of the first goniometer and to an input of the second goniometer.

15. The polarization-plane tracking receiving system according to claim 1, wherein said second means further comprises an intermediate signal processing means including respective mixers coupled to the outputs of said combiner; an oscillator coupled to said mixers; respective I.F. amplifiers coupled to the outputs of said mixers; an automatic gain control means, including an amplitude detector, coupled to said respective I.F. amplifiers and a device for automatically controlling the gain of said respective I.F. amplifiers; and a device for detecting the ratio of the amplitudes of the outputs from said respective I.F. amplifiers and their phase differentials.

References Cited

UNITED STATES PATENTS

| | | |
|---|---|---|
| 3,137,853 | 6/1964 | Cutler. |
| 3,234,547 | 2/1966 | Katzin. |
| 3,310,805 | 3/1967 | Viglietta et al. |

RODNEY D. BENNETT, Primary Examiner

T. H. TUBBESING, Assistant Examiner